United States Patent [19]

Kaneko et al.

[11] Patent Number: 5,708,827
[45] Date of Patent: Jan. 13, 1998

[54] SPREAD SHEET CALCULATION METHOD AND APPARATUS BY EXTRACTING AN AREA TO BE UPDATED BY A CALCULATION FORMULA

[75] Inventors: Yasushi Kaneko; Tadashi Yamamitsu, both of Hadano; Tetsuya Kondo, Tajimi, all of Japan

[73] Assignees: Hitchi, Ltd., Tokyo; Hitachi Chubu Software, Ltd., Nagoya, both of Japan

[21] Appl. No.: 529,713

[22] Filed: Sep. 18, 1995

Related U.S. Application Data

[63] Continuation of Ser. No. 267,396, Jun. 29, 1994, abandoned.

[30] Foreign Application Priority Data

Jun. 29, 1993 [JP] Japan ................... 5-158469

[51] Int. Cl.⁶ ................ G06F 17/60; G06F 19/00
[52] U.S. Cl. .................................. 395/764
[58] Field of Search ...................... 395/161, 149, 395/148, 764, 765

[56] References Cited

U.S. PATENT DOCUMENTS

| | | | |
|---|---|---|---|
| 5,021,973 | 6/1991 | Hernandez et al. | 364/419.1 |
| 5,033,009 | 7/1991 | Dubnoff | 364/523 |
| 5,040,131 | 8/1991 | Torres | 395/148 |
| 5,095,429 | 3/1992 | Harris et al. | 364/408 |
| 5,231,577 | 7/1993 | Koss | 364/419.1 |
| 5,241,620 | 8/1993 | Ruggiero | 395/22 |
| 5,272,628 | 12/1993 | Korr | 369/419.19 |
| 5,276,607 | 1/1994 | Harris et al. | 369/401 |
| 5,280,575 | 1/1994 | Young et al. | 395/148 |
| 5,303,146 | 4/1994 | Ammirato et al. | 364/401 |
| 5,317,686 | 5/1994 | Salas et al. | 395/159 |
| 5,325,478 | 6/1994 | Shelton et al. | 395/148 |
| 5,339,410 | 8/1994 | Kanai | 395/600 |
| 5,371,675 | 12/1994 | Greif et al. | 364/419.1 |
| 5,396,587 | 3/1995 | Reed et al. | 395/145 |

FOREIGN PATENT DOCUMENTS

567126(A) 3/1993 Japan.

OTHER PUBLICATIONS

Stinson, Spreadsheet Heavyweights Take on 1-2-3, PC Magazine, p. 155, Apr. 24, 1990.

*Primary Examiner*—Gail O. Hayes
*Assistant Examiner*—Steven R. Yount
*Attorney, Agent, or Firm*—Antonelli, Terry, Stout & Kraus, LLP.

[57] ABSTRACT

In a spread sheet calculation apparatus, a spread sheet data table stores spread sheet data such as a sales table, a calculation formula table stores calculation formulas defining the calculation of the spread sheet data and a display device displays the spread sheet data and the calculation formula. When a desired area on a display screen is designated by an input device to enter data, a calculation formula control unit searches for a calculation formula which relates to the designated area from the calculation formula table and executes the calculation formula. A spread sheet data control unit updates the data of related areas of the spread sheet data table. A reference area extracting unit extracts the area which is to be updated by the calculation formula, and a display attribute control unit changes a display attribute (for example, meshing) of the data of the corresponding area in the spread sheet data table. A calculation formula list display control unit displays a list of calculation formulas stored in the calculation formula table and changes a display form of the calculation formulas contributed to the update of the data.

5 Claims, 5 Drawing Sheets

| # | A | B | C | D | E | F |
|---|---|---|---|---|---|---|
| 1 | | | | | | |
| 2 | | MERCHANDISE SALE TABLE | | | | |
| 3 | | UNIT PRICE | SALES VOLUME | SALES AMOUNT OF MONEY | | |
| 4 | MERCHANDISE a | 150 | 2 | 300 | | |
| 5 | MERCHANDISE b | 200 | 3 | 600 | | |
| 6 | MERCHANDISE c | 300 | 4 | 1,200 | | |
| 7 | AMOUNT | | 9 | 2,100 | | |
| 8 | | | | | | |

REFERENCE AREA DISPLAY MODE (ON,OFF)=ON

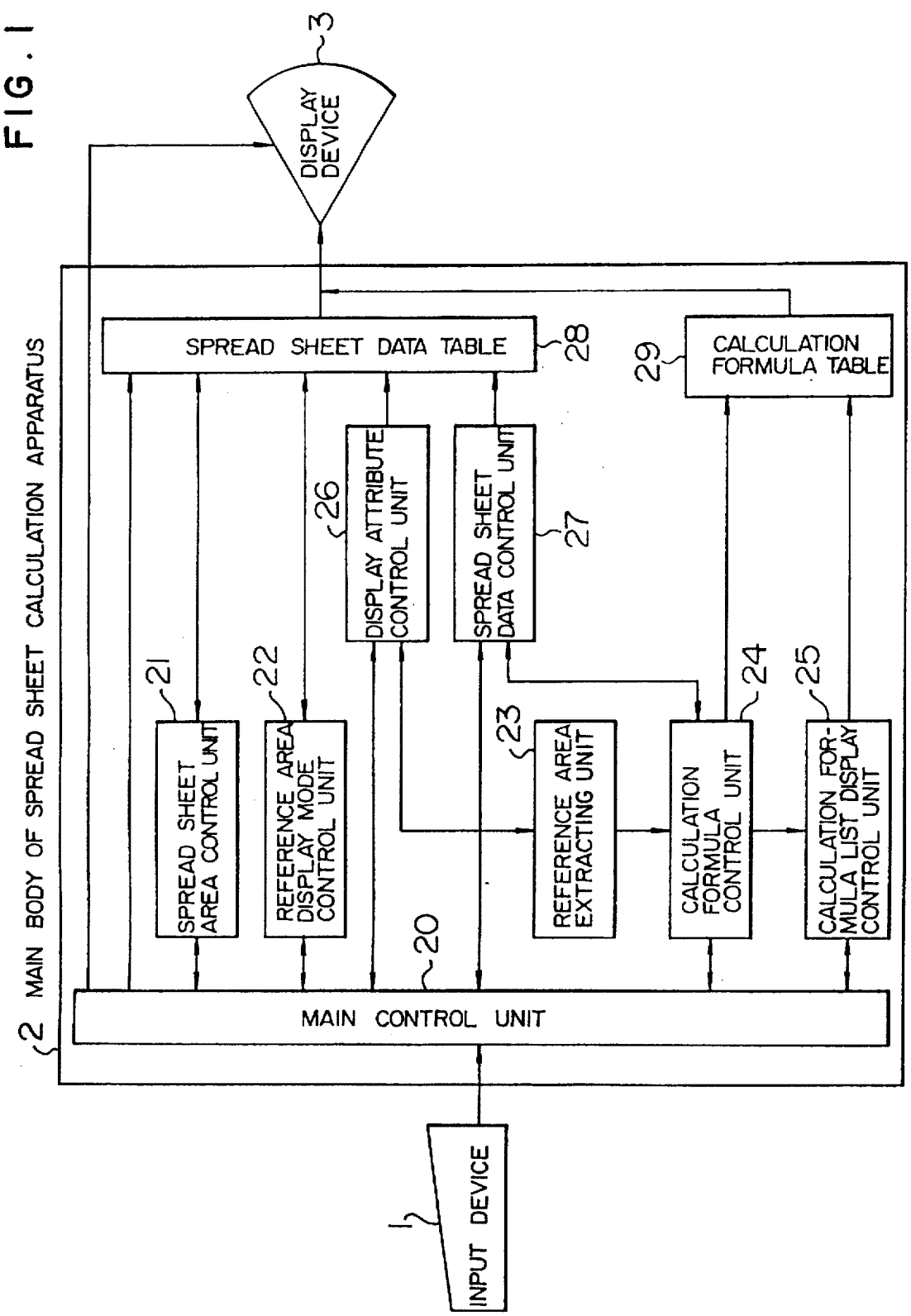

FIG. 2A

| # | A | B | C | D | E | F |
|---|---|---|---|---|---|---|
| 1 | | | | | | |
| 2 | | | MERCHANDISE SALE TABLE | | | |
| 3 | | UNIT PRICE | SALES VOLUME | SALES AMOUNT OF MONEY | | |
| 4 | MERCHANDISE a | 100 | 2 | 200 | | |
| 5 | MERCHANDISE b | 200 | 3 | 600 | | |
| 6 | MERCHANDISE c | 300 | 4 | 1,200 | | |
| 7 | AMOUNT | | 9 | 2,000 | | |
| 8 | | | | | | |

REFERENCE AREA DISPLAY MODE (ON,OFF)=ON

FIG. 2B

```
D4 = B4 * C4
D5 = B5 * C5
D6 = B6 * C6
C7 = TOTAL (C4~C6)
D7 = TOTAL (D4~D6)
```

FIG. 3A

| # | A | B | C | D | E | F |
|---|---|---|---|---|---|---|
| 1 | | | MERCHANDISE SALE TABLE | | | |
| 2 | | UNIT PRICE | SALES VOLUME | SALES AMOUNT OF MONEY | | |
| 3 | MERCHANDISE a | 150 | 2 | 300 | | |
| 4 | MERCHANDISE b | 200 | 3 | 600 | | |
| 5 | MERCHANDISE c | 300 | 4 | 1,200 | | |
| 6 | AMOUNT | | 9 | 2,100 | | |
| 7 | | | | | | |

REFERENCE AREA DISPLAY MODE (ON, OFF) = ON

FIG. 3B

```
D4 = B4 * C4
D5 = B5 * C5
D6 = B6 * C6
C7 = TOTAL (C4~C6)
D7 = TOTAL (D4~D6)
```

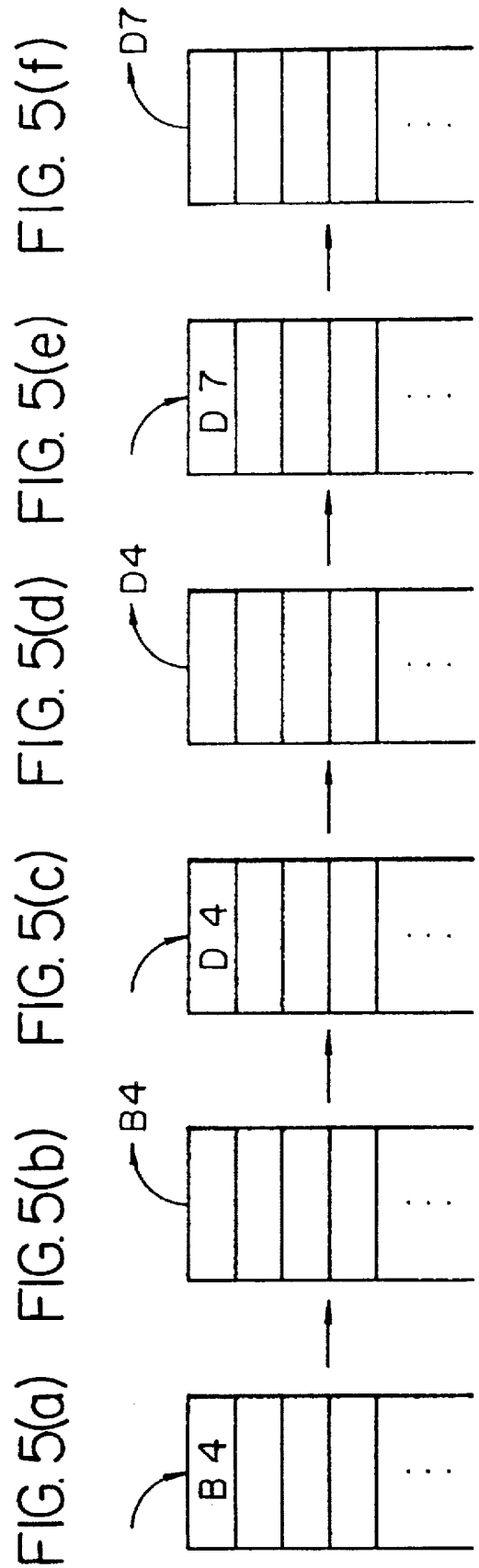

SPREAD SHEET CALCULATION METHOD AND APPARATUS BY EXTRACTING AN AREA TO BE UPDATED BY A CALCULATION FORMULA

This application is a continuation application of Ser. No. 08/267,396, filed Jun. 29, 1994, now abandoned.

BACKGROUND OF THE INVENTION

The present invention relates to a spread sheet calculation apparatus for calculating a spread sheet such as a sales table or a budget table by a calculation formula defined in the spread sheet, and more particularly to a spread sheet calculation method in which when data in a certain area in the spread sheet is updated, other areas and calculation formulas related thereto are manifested on a work sheet on a display screen, and an apparatus therefor.

In the spread sheet calculation apparatus, a list of items to be processed and a list of calculation formulas related to the list of items are displayed on a display screen as a work sheet so that a user manipulates a keyboard or a pointing device while he/she watches the work sheet to update data in a spread sheet area or modify a calculation formula. When the user specifies a desired area on the spread sheet area by the keyboard or the pointing device to enter data, the spread sheet calculation apparatus updates the data in that area, and if there is a calculation formula which relates to that area, it executes the calculation formula to update data of other areas which are modified thereby, and if there is a calculation formula which relates to the other areas, it executes that calculation formula to update data of the other modified areas.

Thus, when data in a certain area of the spread sheet is updated, data in all related areas are automatically updated and this is a feature and an advantage of the spread sheet calculation apparatus.

Further, in the spread sheet calculation apparatus, a display attribute of an area in which a calculation formula may be set is changed from those of other areas to manifest the spread sheet area in which the calculation formula is set.

Such spread sheet calculation process is disclosed in JP-A-5-67126.

In the prior art spread sheet calculation apparatus, however, the area in which the calculation formula is set may be identified but no consideration is given to the identification of the relationship of the calculation formulas set in the spread sheet areas. Namely, when data in one area is modified and a result of calculation is to be viewed after modification of the data, no consideration is given in the prior art apparatus for a visual indication of data of other areas which are modified by the modification of the data of the one area. Accordingly, in order to check the related areas to check the normal completion of the calculation process, the calculation formulas set in the areas must be examined individually to check the relationship therebetween. This checking process takes a long time and failure to check is always possible.

SUMMARY OF THE INVENTION

It is an object of the present invention to facilitate the checking of the relationship of the calculation formulas and improve the operability in the spread sheet calculation apparatus by manifesting on a display screen all spread sheet areas which are updated by the execution of the related calculation formulas as the data in the specified spread sheet area is first updated.

In order to achieve the above object, the spread sheet calculation apparatus of the present invention comprises an input device, a display device, a spread sheet data table and a calculation formula table which stores calculation formulas defining calculations of the spread sheet data. When the spread sheet data of the spread sheet data table is displayed on the display device and a desired area of the spread sheet data on the display screen is designated by the input device to enter data, the calculation defined by the calculation formula related to the corresponding area of the calculation formula table is executed and the data in the areas related to the designated area in the spread sheet data are updated. In response to the designation of the desired area of the spread sheet table on the display screen, the area in which the data is updated by the calculation formula is extracted and the display form of the data in the extracted area is changed.

Further, in accordance with the present invention, a list of the calculation formulas stored in the calculation formula table is displayed and the display form of the calculation formulas which contributed to the update of the data is changed.

When an area (or a region including a plurality of areas) of the spread sheet data on the work sheet on the display screen is designated by the input device such as the keyboard or pointing device, a calculation formula which refers that display area is searched for from the calculation formula table by using that area as a key, and a display area in which the calculation result is to be placed and the calculation formula are extracted. A calculation formula is searched in a similar manner by using the extracted area as a key to extract the next reference area and calculation formula. In this manner, starting from the designated area, the reference relationship of the calculation formula is tracked to extract all areas and calculation formulas which directly or indirectly to the designated area. For all of the extracted areas and calculation formulas, the display form (color, meshing, etc.) is changed. In this manner, all areas and calculation formulas of the spread sheet data which directly or indirectly refer to the designated area can be checked at a glance on the work sheet on the display screen.

BRIEF DESCRIPTION OF THE DRAWINGS

FIG. 1 shows a configuration of a spread sheet calculation apparatus in accordance with one embodiment of the present invention, FIG. 2A shows an example of display of a work sheet on a display screen before the update of data, FIG. 2B shows a calculation formula for FIG. 2A, FIG. 3A shows an example of display of a work sheet on the display screen after the update of data, FIG. 3B shows a calculation formula for FIG. 3A, FIG. 5 shows a status chart of a stack in the embodiment of FIG. 1.

DESCRIPTION OF THE PREFERRED EMBODIMENTS

Figure 4:
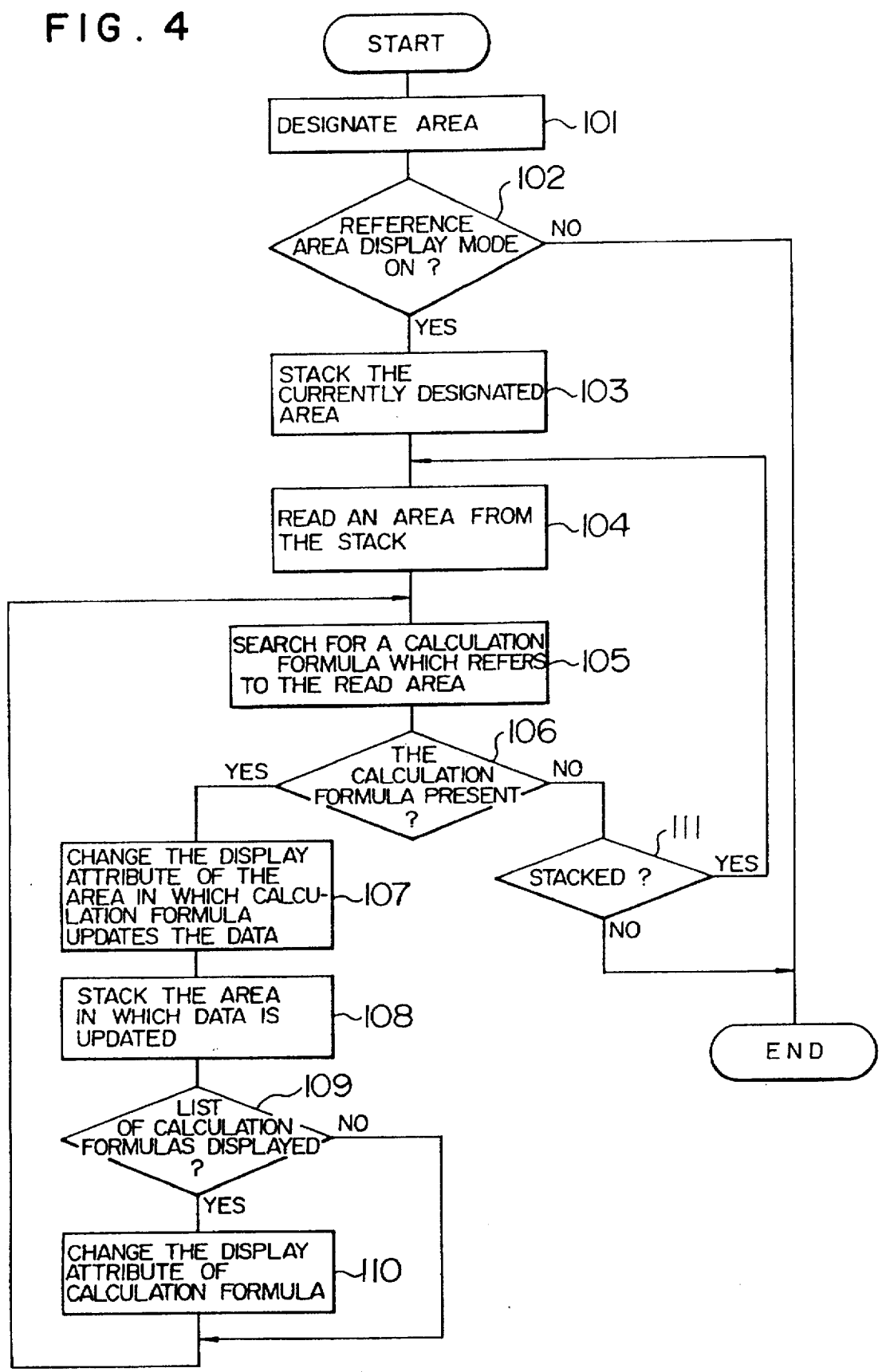
FIG. 4 shows a flow chart of a process relating to the embodiment of the present invention of FIG. 1.

One embodiment of the present invention is explained in detail with reference to the drawings.

FIG. 1 shows a block diagram of one embodiment of the spread sheet calculation apparatus of the present invention. Numeral 1 denotes an input device comprising a keyboard and a pointing device, numeral 2 denotes a main body of the spread sheet calculation apparatus, and numeral 3 denotes a display device. The main body 2 of the spread sheet calculation apparatus comprises a main control unit 20, a spread sheet area control unit 21, a reference area display mode control unit 22, a reference area extracting unit 23, a calculation formula control unit 24, a calculation formula list display control unit 25, a table attribute control unit 26, a spread sheet data control unit 27, a spread sheet data table 28 and a calculation formula table 29.

The main control unit 20 is responsible for the overall control of the apparatus. The spread sheet area control unit 21 controls the area of the spread sheet data in the spread sheet data table 28. The reference area display mode control unit 22 turns the reference area display mode on and off in accordance with the mode set by the input device 1. When the data in the spread sheet area is updated, the reference area display mode indicates the validity (for example, ON for valid and OFF for invalid) of the change of the display attribute (color, meshing, etc.) of the related area and the calculation formula. In the present embodiment, the reference area display mode control unit 22 holds a flag. When the reference area display mode is ON, the reference area extracting unit 23 extracts the area in which the data is updated (that is, related area) based on the calculation formula given by the calculation formula control unit 24. The calculation formula control unit 24 searches the calculation formula from the calculation formula table 29 and executes the searched calculation formula. The calculation formula list display control unit 25 controls the display of the calculation formula list in the calculation formula table 29, and when the reference area display mode is ON, it changes the display attribute of the calculation formula searched for by the calculation formula control unit 24. When the reference area display mode is ON, the display attribute control unit 26 changes the display attribute of the area data extracted by the reference area extracting unit 23 from the spread sheet data in the spread sheet data table 28. The spread sheet data control unit 27 updates the data of that area in the spread sheet data table 28 based on the data input by the input device 1 or the data calculated by the calculation formula control unit 24.

The spread sheet data table 28 stores spread sheet data such as a sales table or a budget table. The calculation formula table 29 stores calculation formulas which define the spread sheet calculation of the spread sheet data table 28. The spread sheet data of the spread sheet data table 28 and the calculation formula data of the calculation formula table 29 have flags of the display attribute (color, meshing, etc.).

The spread sheet data to be processed in the spread sheet table 28 and the reference area display mode, and the calculation formula list of the calculation formula table 29 which relate to the spread sheet are displayed on the display screen of the display device 3. This display screen is referred to as a work sheet. The user manipulates the keyboard or the pointing device while watching the work sheet on the display screen to change the data in a certain area. As a result, the spread sheet area control unit 21, the calculation formula control unit 24 and the spread sheet data control unit 27 are operated under the control of the main control unit 20, and the data in all areas related to that certain area in the spread sheet data table 28 are updated and the display on the display screen is updated accordingly. If the reference area display mode is ON as a result of mode key manipulation by the user, the reference area extracting unit 23, the calculation formula list display control unit 25 and the display attribute control unit 26 are also operated so that the display attributes of the area in the spread sheet data table 28 and the calculation formula table 29 in which the data has been updated, and the related calculation formulas are updated. For example, the corresponding area on the work sheet on the display screen is changed to the meshing.

In the display of the work sheet on the display device 3, the content of the spread sheet table 28 and the content of the calculation formula table 29 may be selectively displayed one at a time. Alternatively, the display of the list of the calculation formulas of the calculation formula table 29 may be omitted.

FIGS. 2A and 2B show a specific example of display. FIG. 2A shows an example of the display of the contents of the spread sheet data table 28, and FIG. 2B shows an example of display of a content of the calculation formula table 29. In a merchandise sale table shown in FIG. 2A, a sales amount for each item of merchandise, and a total volume of sales of the overall merchandise items and a total amount of sales are determined by calculation formulas shown in FIG. 2B based on unit prices of merchandise items a, b and c and the sales volumes. In FIG. 2B, D4=B4*C4 indicates that a product of the data in the area (B4) and the data in the area (C4) is represented by the data in the area (D4). Same is true for D5=B5*C5 and D6=B6*C6. C7=TOTAL (C4–C6) indicates that the data in the areas C4–C6 is represented by the data in the area (C7), and D7=TOTAL (D4–D6) indicates that the total of the data in the areas (D4–D6) is represented by the data in the area (D7).

In FIG. 2A, it is assumed that the unit price of the merchandise a, that is, the data in the area (B4) is changed. As seen from FIG. 2B, the area (B4) is referred from the area (D4) by the calculation formula D4=B4*C4, and the area (D4) is referred from the area (D7) by the calculation formula D7=TOTAL (D4–D6). As a result, when the data in the area (B4) is changed, the data in the areas (D4) and (D7) are automatically updated by the recalculation process by the calculation formula control unit 24. If the reference area display mode is ON at this time, the area (D4) which refers directly to the area (B4) and the area (D7) which indirectly refers the area (B4) are displayed in mesh, for example, as shown in FIG. 3A. Similarly, as shown in FIG. 3B, the calculation formulas which directly or indirectly refer to the area (B4) are displayed in mesh.

FIG. 4 shows a process for changing the display attribute of the related areas and related calculation formulas as the data in the designated area is changed when the reference area display mode is ON in the embodiment of FIG. 1. The process of FIG. 4 is now explained with reference to the case of FIG. 2. A stack status chart of FIG. 5 is also referred to.

When the area is designated by the input device 1 (step 101), whether the reference area display mode flag is ON or not is determined by the reference area display mode control unit 22 through the main control unit 20 (step 102). If the reference area display mode flag is OFF, the predetermined recalculation is executed based on the subsequently updated data and the process is terminated. The detailed description of the recalculation process is omitted.

If the reference area display mode flag is ON, the main control unit 20 acquires the currently designated area (for example, coordinates thereof) and stacks it (step 103). Then, the main control unit 20 reads the first one of the stacked areas and delivers it to the calculation formula control unit 24 (step 104). In the example of FIG. 2A, the area (B4) is designated. The area (B4) is first stacked and it is then read and delivered to the calculation formula control unit 24. The status of the stack is shown in (a) and (b) of FIG. 5.

The calculation formula control unit 24 searches the calculation formula table 29 by using the area (B4) as a key (step 105) to determine whether there is a calculation formula which refers to the area (B4) or not (step 106). In FIG. 2B, the calculation formula D4=B4*C4 is detected. The calculation formula control unit 24 executes the calculation formula D4=B4*C4 and sends the updated data to the spread sheet data control unit 27, and the spread sheet data control unit 27 updates the data in the corresponding area of the spread sheet data table 28. This process is omitted in FIG. 4.

The calculation formula control unit 24 sends the calculation formula D4=B4*C4 as well as the area (B4) to the reference area extracting unit 23. The reference area extracting unit 23 extracts the area (D4) by the calculation formula D4=B4*C4 as the area in which the data is to be updated by the change of data in the area (B4), and the display attribute control unit 26 changes the display attribute (for example, meshing) of the corresponding area (D4) in the spread sheet data table 28 (step 107). The reference area extracting unit 23 sends the extracted area (D4) to the main control unit 20, which stacks the area (D4) (step 108). The status of the stack is shown in (c) of FIG. 5.

On the other hand, the calculation formula list display control unit 25 determines whether the list of the calculation formulas is being displayed or not (step 109), and if it is being displayed, it receives the calculation formula D4=B4*C4 from the calculation formula control unit 24 and changes the display attribute (for example, meshing) of that calculation formula in the calculation formula table 29 (step 110).

Thereafter, the process returns to the step 105 and the calculation formula control unit 24 determines whether or not there are other calculation formulas in the calculation formula table 29 which refer the area (B4), and if there are, it reexecutes the steps 107–110, and if there are not, the process proceeds to a step 111. In FIG. 2B, no other calculation formula than D4=B4*C4 which refers to the area (B4) is present. Thus, the process proceeds to the step 111. In the step 111, whether or the main control unit 20 has an area in the stack is determined, and if it has, the process returns to the step 104, and if it does not, the process is terminated. In the present embodiment, since the area (D4) is stacked in the step 108, the process returns to the step 104 and the area (D4) is read and the step 105 and the following steps are executed. A status of the stack is shown in (d) of FIG. 5.

In the step 105, the calculation formula table 29 is searched by using the area (D4) as a key. In FIG. 2B, the calculation formula D7=TOTAL (D4–D6) is detected in the step 106. Then, in the step 107, the area (D7) is extracted and the display attribute of the corresponding area (D7) in the spread sheet data table 28 is changed. In the step 108, the area (D7) is stacked. A status of the stack is shown in (e) of FIG. 5.

In the steps 109 and 110, the display attribute of the calculation formula D7=TOTAL (D4–D6) in the calculation formula table 29 is changed. The process then returns to the step 105. Since there is no other calculation formula in the calculation formula table 29 which refers to the area (D7), the decision in the step 106 is NO and the process proceeds to the step 111. The presence of the stack of the area (D7) is determined and the process returns to the step 104.

In the step 104, the area (D7) is read as shown in (f) of FIG. 5, and in the step 105, the calculation formula table 29 is searched for by using the area (D7) as a key. Since there is no other calculation formula which refers to the area (D7), the decision in the step 106 is NO and the process proceeds to the step 111. Since there is no remaining area in the stack, the decision in the step 111 is NO and the process is terminated.

In accordance with the present embodiment, during the data input of the spread sheet area, all other areas which directly or indirectly refer to that area can be checked by a user at a glance on the work sheet on the display screen without referring to the calculation formula list.

When the calculation formula is changed, the display attribute of the areas related to the change of content can be changed.

In the present embodiment, the reference area display mode is set by the input device 1. Alternatively, it may be automatically set and modified by automatic setting at the time of editing the calculation formula.

In accordance with the present invention, during the data input of the spread sheet area, all other areas which directly or indirectly refer to that area can be checked by a user at a glance on the work sheet on the display screen without referring to the calculation formula list. Accordingly, the check of the normal completion of the recalculation process after the modification of the data is facilitated.

In accordance with the present invention even if there is a fault in the calculation formula setting such as failure to set the calculation formula or an extra calculation formula is set, it can be easily detected in an early stage on the work sheet.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A spread sheet calculation method for displaying spread sheet data of a spread sheet table on a display device, designating a first area of the spread sheet data on a display screen by an input device for the purpose of updating the spread sheet data, executing a calculation defined by a calculation formula related to said first area in a calculation formula table defining the calculation of the spread sheet data and updating data of a second area related to said first area in the spread sheet data, said method comprising the steps of:

extracting said second area in which the data is to be updated by the calculation formula in response to the designation of said first area in the spread sheet data on the display screen;

changing, so as to emphasize, the displayed form of the data of said second are;

displaying a list of calculation formulas stored in the calculation formula table and changing, so as to emphasize, the displayed form of the calculation formulas related to the update of the data.

2. A spread sheet calculation apparatus for displaying spread sheet data of a spread sheet table on a display device, designating a first area of the spread sheet data on a display screen by an input device for the purpose of updating the spread sheet data, executing a calculation defined by a calculation formula related to said first designated area in a calculation formula table defining the calculation of the spread sheet data and updating data of a second area related to said first area in the spread sheet data, comprising:

first means for extracting said second area in which the data is to be updated by the calculation formula in response to the designation of said first area in the spread sheet data on the display screen;

second means for changing, so as to emphasize, the displayed form of the data of said second area;

third means for displaying a list of calculation formulas stored in the calculation formula table and changing, so as to emphasize, the displayed form of the calculation formulas related to the update of the data.

3. A spread sheet calculation apparatus having a spread sheet data table for storing spread sheet data and a calculation formula table defining the calculation of the spread sheet data, comprising:

a spread sheet area control unit for controlling a spread sheet data area of the spread sheet data table;

a calculation formula control unit for controlling the displaying of a calculation formula list of the calculation formula table;

a reference area extracting unit for extracting, when a reference area display mode indicates a valid power mode, a first area in which data is to be modified, based on the calculation formula given by the calculation formula control unit;

a calculation formula list display control unit for changing a display attribute of the calculation formula searched for by the calculation formula control unit;

a display attribute control unit for changing a display attribute of the data of the spread sheet data in the spread sheet data table which is extracted by said reference area extracting unit; and a spread sheet data control unit for updating data of a second area in the spread sheet data table based on either of the data updated from the input device and data calculated by the calculation formula control unit.

4. A spread sheet calculation method, comprising the steps of:

displaying spread sheet data of a spread sheet table on a display device;

designating an area of the spread sheet data on a display screen by an input device for the purpose of updating the spread sheet data;

extracting the area in which the data is to be updated based on a calculation formula related to the designated area in a calculation formula table defining the calculation of the spread sheet data;

executing the calculation defined by the calculation formula related to the designated area; and updating the displayed form of both the data of the extracted area in the spread sheet data and the calculation formula related to the designated area.

5. A spread sheet calculation apparatus, comprising:

means for displaying spread sheet data of a spread sheet table on a display device;

means for designating an area of the spread sheet data on a display screen by an input device for the purpose of updating the spread sheet data;

means for extracting the area in which the data is to be updated based on a calculation formula related to the designated area in a calculation formula table defining the calculation of the spread sheet data;

means for executing the calculation defined by the calculation formula related to the designated area; and means for updating the displayed form of both the data of the extracted area in the spread sheet data and the calculation formula related to the designated area.

\* \* \* \* \*